United States Patent [19]

Khismatulin et al.

[11] Patent Number: 4,483,166
[45] Date of Patent: Nov. 20, 1984

[54] DEVICE FOR HELICALLY COILING PRESSURE VESSEL SHELLS

[76] Inventors: Enver R. Khismatulin, Ulitsa 4 Zheleznodorozhnaya, 46b, kv. 16; Marat M. Shel, Ulitsa Kievskaya, 4, kv. 15; Alexandr N. Novikov, Ulitsa Kurchatova, 9, kv. 41, all of Irkutsk; Viktor M. Makarov, ulitsa Sakko i Vantsetti, 58, kv. 35; Petr G. Serov, ulitsa Griboedova, 15, kv. 16, both of Sverdlovsk; Vasily D. Trotsenko, ulitsa Kurchatova, 5, kv. 30, Irkutsk; Sergei I. Nikolsky, ulitsa Kommunisticheskaya, 76, kv. 51, Irkutsk; Pavel G. Pimshtein, ulitsa Kurchatova, 13, kv. 13, Irkutsk, all of U.S.S.R.

[21] Appl. No.: 413,336
[22] PCT Filed: Dec. 24, 1980
[86] PCT No.: PCT/SU80/00212
 § 371 Date: Aug. 19, 1982
 § 102(e) Date: Aug. 19, 1982
[87] PCT Pub. No.: WO82/02156
 PCT Pub. Date: Jul. 8, 1982

[51] Int. Cl.³ .................... B21C 37/06; B21D 51/02
[52] U.S. Cl. .................................................. 72/137
[58] Field of Search ............... 72/49, 50, 135, 137, 72/142, 144, 145; 228/17.7, 145

[56] References Cited

U.S. PATENT DOCUMENTS

| 877,073 | 1/1908 | Greenfield | 72/49 X |
| 3,845,645 | 11/1974 | Gebauer | 72/135 X |
| 3,851,376 | 12/1974 | Gross et al. | 228/145 |
| 3,882,708 | 5/1975 | Schaaps | 72/135 |
| 3,991,597 | 11/1976 | Krakow | 228/145 X |

FOREIGN PATENT DOCUMENTS

| 2053266 | 5/1972 | Fed. Rep. of Germany | 72/49 |
| 506272 | 10/1970 | U.S.S.R. | |
| 517440 | 5/1974 | U.S.S.R. | |
| 496706 | 12/1975 | U.S.S.R. | |
| 685380 | 9/1979 | U.S.S.R. | 72/49 |

Primary Examiner—E. Michael Combs
Attorney, Agent, or Firm—Fleit, Jacobson, Cohn & Price

[57] ABSTRACT

A device for helical coiling of pressure vessel shells comprises a frame (4) traversable along the axis of a pressure vessel shell (1). The bottom portion of the frame (4) mounts a pressing mechanism 5 vertically traversable along the radius of the pressure vessel shell. A mechanism (6) for tensioning the steel strip being coiled is located before the pressing mechanism (5) as along the direction of run of the steel strip (13) from a coil (9) towards the pressure vessel shell (1). The pressing mechanism (5) has a beam (23) secured on the frame (4) and provided with forks (21) and rollers (20), both facing the pressure vessel shell. Each of the rollers (20) is mounted in its own fork (21) and spaced apart from another roller a distance 10 to 50 times the thickness of the steel strip (13) being coiled, and is situated on the generatrix of the pressure vessel shell (1) across the entire width of the steel strip (13) being coiled. The steel strip tensioning mechanism (6) is made as a group of rolls (16) of which the extreme two rolls (18, 19), as in the direction of run of the steel strip, have a convex and a concave camber, respectively, facing the surface of the steel strip (13). The radius of curvature of said cambered roll surfaces is determined by the thickness and mechanical characteristics of the steel strip (13) being coiled and by the amount of plastic deformation required to compensate for the marginal effect tending the edges of the steel strip (13) to flange outwards when the strip is being coiled onto the pressure vessel shell (1) past the pressing mechanism (5).

1 Claim, 4 Drawing Figures

DEVICE FOR HELICALLY COILING PRESSURE VESSEL SHELLS

FIELD OF THE INVENTION

The present invention relates generally to devices for manufacturing cylindrical products and pipes and more specifically, to devices for helical coiling of shells of multiwall pressure vessels.

BACKGROUND ART

The shells of multiwall pressure vessels are made by helical coiling of a steel strip onto a central tubular member in such a way that each turn of the steel strip is wound in an opposite direction with respect to a preceding layer, and the turns of the steel strips are welded together only in a few outside layers. The strength of pressure vessels made by this method is badly affected by the force of friction of the steel strip. Hence, the layers of the steel strip should be a tight fit with one another.

To attain a tight fit of the steel strip layers with one another in the course of shell coiling is a complicated problem whose solution involves accurate folowing of the coiling pitch, snug fitting of the steel strip while coiling, ensuring against flanging outwards of the steel strip edges, which arises from the marginal bending effect when coiling the steel strip round a central tubular member.

One prior-art device for helical winding of pressure vessel shells is widely known (cf. USSR Inventor's Certificate No. 517,440, published in the Bulletin "Discoveries, inventions, industrial designs and trade marks" No. 22, 1976 (in Russian). The device comprises (a trolley traversable along a rail-truck and carrying a table and a swivel frame, which in turn mounts expansible detachable yokes with pressing rollers. The swivel frame carries also a mechanism for tensioning the steel strip being coiled. The pressing rollers appear as rolls situated on both sides of a vertical diameter of the vessel shell being coiled to press it from both sides. The roll axis makes up an angle with the generating line of the pressure vessel cylindrical shell being coiled, which angle equals the angle of coiling of the steel strip.

The mechanism for tensioning the steel strip being coiled adapted for more tight and snug laying of the steel strip layers in the course of coiling, is made as two plates between which the steel strip being coiled is drawn through.

The above-described device, however, fails to provide a snug fit of the steel strip to the central tubular member and to the below-laid steel strip layers in the course of coiling. This is due to the fact that the roll-shaped pressing roller is pressed against the generating line of the pressure vessel cylindrical shell at a single point only, as it is turned to the pressure shell generating line at an angle equal to the angle of coiling. Thus, the steel strip being coiled is pressed against the shell at a single point rather than across the entire width. As a result, the steel strip is laid on to the central tubular member or on to the below-laid layers not snugly, except for a narrow belt where the strip is pressed tightly. Apart from this, when coiling a steel strip onto the central tubular member of a pressure vessel shell, the edges of the steel strip being coiled are flanged outwards past the pressing mechanism if viewed along the direction of the steel strip run. Thus, the mechanism for tensioning the steel strip being coiled, made up of two plates fails to provide uniform tensioning of the steel strip involved.

The outward flanging of the steel strip results in that some gaps appear when coiling a next layer of the strip, whereby the tightness of fitting of the layers of the steel strip being coiled to one another is badly affected.

DISCLOSURE OF THE INVENTION

The present invention is aimed at the provision of such a device for coiling the shells of multiwall pressure vessels that features the constructional arrangement of a pressing mechanism and a tensioning mechanism for the steel strip being coiled, which would make it possible to attain higher quality and reliability of the pressure vessels manufactured.

According to the invention, in a device for helical coiling of pressure vessel shells, comprising a frame traversable along the axis of the pressure vessel shell being coiled, a pressing mechanism secured on the frame bottom portion and vertically traversable along the radius of the pressure vessel shell being coiled, a mechanism for tensioning the steel strip being coiled, located before the pressing mechanism as viewed along the direction of run of the steel strip being coiled from the coil towards the pressure vessel shell, according to the invention, the pressing mechanism has a frame-secured beam provided with forks facing the vessel shell, and rollers each of which is mounted in its own fork and spaced apart from another roller a distance 10 to 50 times the thickness of the steel strip being coiled, and is situated on the generating line of the vessel shell across the entire width of the steel strip being coiled, while the steel strip tensioning mechanism is fashioned as a group of rolls of which the two extreme ones, if viewed along the direction of run of the steel strip, have a convex and a concave camber, respectively, facing the steel strip surface and featuring the radius of curvature determined by the thickness and mechanical characteristics of the steel strip being coiled and by the amount of plastic deformation required to compensate for the marginal effect tending the strip edges to flange outwards when the strip is coiled onto the vessel shell past the pressing mechanism.

Application of the device for helical coiling of pressure vessel shells, according to the invention, ensures against outward flanging of the steel strip edges, whereby a tighter and snugger coiling of the steel strip layers is attained.

Furthermore, it is due to higher quality of steel strip coiling into pressure vessel shells that more uniform loading of the steel strip layers constituting the pressure vessel shells would occur under the effect of pressure effective inside a vessel. This, in turn, makes it possible to reduce the thickness of the pressure vessel wall and hence to save metal.

BRIEF DESCRIPTION OF THE DRAWINGS

The present invention will become more apparent from a detailed description of a specific embodiment of a device for helical coiling of pressure vessel shells and the accompanying drawings, in which.

PREFERRED EMBODIMENT OF THE INVENTION

Figures 1, 3, 4:
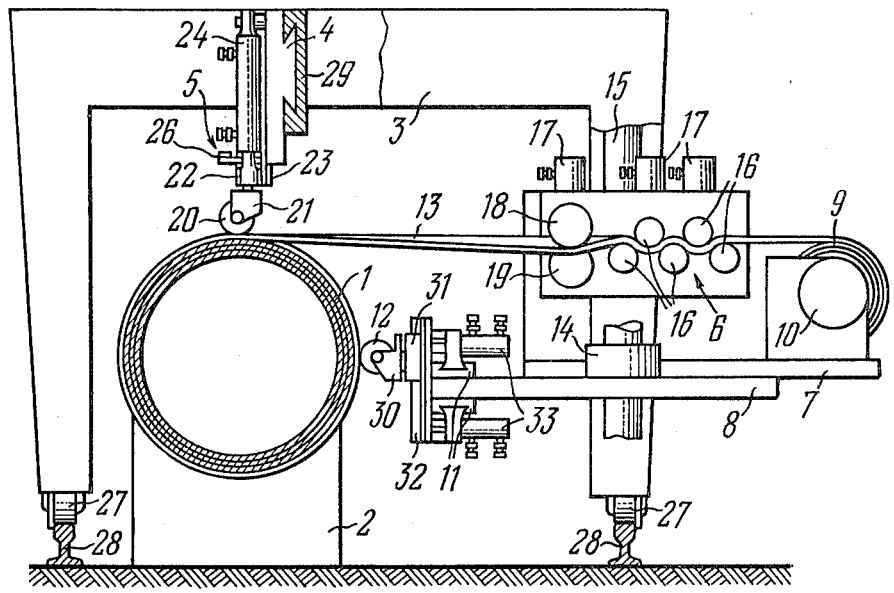
FIG. 1 is a general side view of a device for coiling pressure vessel shells, according to the present invention.
FIG. 3 is a side view of two extreme rolls, as along the direction of run of the steel strip being coiled, of a steel strip tensioning mechanism, according to the present invention.
FIG. 4 is a view of a pressing mechanism of the device in the course of coiling the steel strip as shown from below on the side of the generating line of a pressure vessel cylindrical shell).

The device for coiling of shells 1 (FIG. 1) of multiwall pressure vessels comprises vessel shell rotators 2, a gantry 3 carrying a frame 4, a pressing mechanism 5 secured on the bottom portion of the frame 4, and a roll-type mechanism 6 for tensioning the steel strip being coiled.

The device comprises also a turn-plate 7 swivelling about its vertical axis on a stationary fixed base 8. The turn-plate 7 mountes a mechanism 6 for tensioning the steel strip being coiled and a coil 9 of the steel strip, mounted on a strip uncoiler 10.

The stationary fixed base 8 carries skids 11 which mount thrust rollers 12 adapted to compensate for the forces of tensioning of a steel strip 13 being coiled.

The stationary fixed base 8 (FIG. 2) has sleeves 14 for the base 8 to traverse along columns 15.

The steel strip tensioning mechanism 6 comprises a group of straight-profile rolls 16 compressed by means of a hydraulic cylinder 17, and a pair of rolls 18, 19 (FIG. 1) that are extreme ones as along the direction of run of the steel strip 13 being coiled.

The bottom roll 19 (FIG. 3) is cambered outwards, whereas the top roll 18 is cambered inwards correspondingly. The radius of curvature of the concave and convex cambers of the rolls 18, 19 facing the surface of the steel strip 13 being coiled, is determined by the thickness and mechanical characteristics of the steel strip 13 being coiled and the amount of plastic deformation required to compensate for the marginal effect tending to cause the edge of the steel strip 13 to flange outwards when the strip is wound onto the pressure vessel shell 1 past the pressing mechanism 5.

The pressing mechanism 5 (FIG. 4) comprises rollers 20 fitted in forks 21. Rods 22 of the forks 21 are mounted rotatably around their respective axes on a beam 23. The beam 23 is vertically traversable along the frame 4 and is connected to hydraulic thrust cylinders 24. The rods 22 of the forks 21 have projecting hold-down bars 25 interconnected through a common rail 26.

Each of the rollers 20 is fitted in its own fork 21 and spaced apart from another roller a distance 10 to 50 times the thickness of the steel strip 13 (FIG. 1) being coiled and is located on the generating line of the pressure vessel shell 1 across the entire width of the steel strip 13 being coiled.

The gantry 3 comprises wheels 27 mounted on a rail track 28.

The frame 4 is traversable with respect to the gantry 3 lengthwise of the vessel shell 1 on a cross-arm 29.

The thrust rollers 12 are mounted in forks 30 similar to the forks 21. The forks 30 are affixed to a beam 31, which is secured on a frame 32. The frame 32 carries also hydraulic cylinders 33 adapted to press the thrust rollers 12 against the shell 1 of the vessel being coiled. The frame 32 is mounted on the skids 11 of the stationary fixed base 8, which transmits the force of pressure from the thrust rollers 12 to the gantry 3.

The device for helical coiling of multiwall pressure vessel shells operates as follows.

The shell 1 (FIG. 1) of the pressure vessel is affixed to the rotator 2. Then the tail of the steel strip 13 is wound off the coil 9 and cut at an angle of coiling. Then the steel strip 12 is passed between the rolls 16 of the steel strip tensioning mechanism 6. In this case the hydraulic cylinders 17 are under zero pressure and all the top rolls 16 are raised to clear up the bottom rolls 16.

Figure 2:
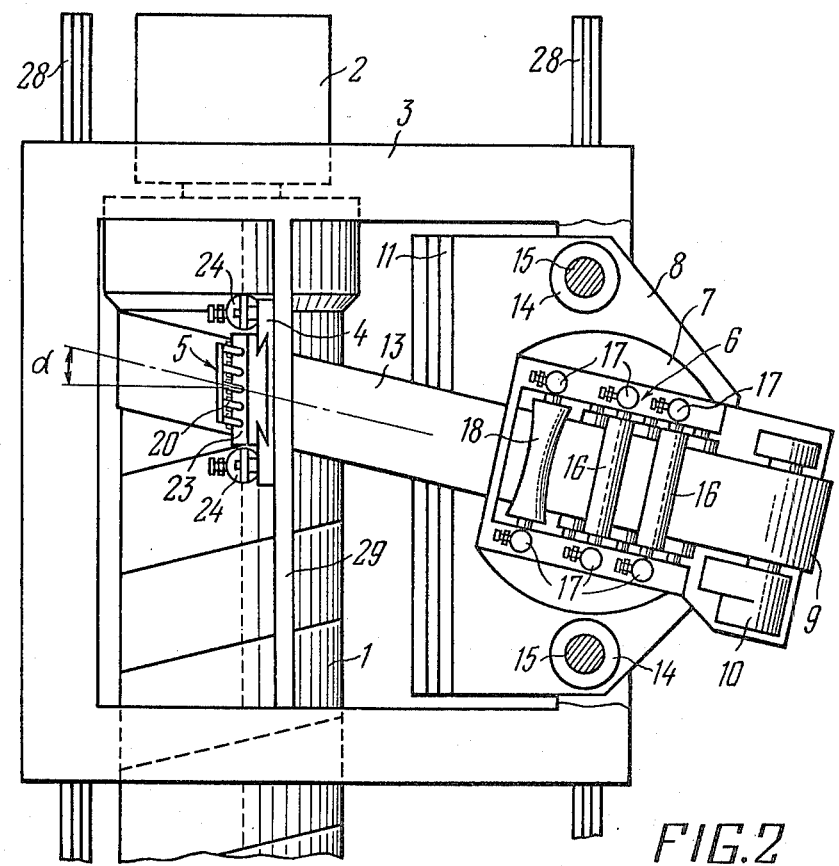
FIG. 2 is a general plan view of a device for coiling pressure vessel shells, according to the present invention.

The turn-plate 7 is set at an angle α of coiling (FIG. 2).

The hydraulic thrust cylinders 24 of the pressing mechanism 5 are also relieved from pressure, and the rolls 20 are raised.

The tail of the steel strip 13 is cut at the coiling angle α.

Then the cut end of the steel strip 13 is welded along the periphery of the cylindrical end portion of the shell 1.

Next a pressure is admitted to pass to the hydraulic cylinders 17 and 24. The steel strip 13 is gripped in the strip tensioning mechanism 6 and simultaneously pressed against the generatrix of the cylindrical portion of the pressure vessel shell 1 by means of the five rollers 20.

Then the rollers 20 (FIG. 1) are set at the coiling angle α (FIG. 2) with the help of the rail 26 actuating the hold-down bars 25 and hence the forks 21.

This ensures that the rollers 20 would then roll along a helical line along the pressure vessel shell 1 while the steel strip 13 is being coiled.

Once the above-mentioned preconditioning operations have been completed, the process of coiling the steel strip 13 commences. To this end the rotor 2 (FIG. 1) and the gantry 3 are put in action at the same time.

The gantry 3 traverses along the pressure vessel shell 1 at such a speed as to move a distance equal to the coiling pitch of the steel strip 13 per revolution of the pressure vessel shell 1. The movements of the gantry 3 and the shell 1 are correlated by an automatic control system (not shown).

When the pressure vessel shell 1 is rotating the steel strip 13 is being coiled thereonto along a helical line.

The steel strip 13, while leaving the tensioning mechanism 6, is transversely convexed to follow the cambered surface of the rolls 18 and 19. The radius R (FIG. 4) of curvature of the rolls 18, 19 is so selected as to compensate for the transverse deformation of the steel strip 13 when curved in the course of coiling past the pressing mechanism 6. The radius R depends also upon the thickness of the steel strip 13, that is, the thicker the steel strip 13 the larger the radius R of curvature of the rolls 18, 19 must be selected.

The radius R of curvature of the rolls 18, 19 is so selected that the surface layers of the steel strip 13 should experience transverse plastic deformation equal to within 0.3 to 2 per cent. To this end the radius of curvature of the rolls 18, 19 is selected to be 80 to 250 times the thickness of the steel strip 13 being coiled. With the above requirements fully met the rolls 18, 19 ensure that no outward flanging of the edges of the steel strip 13 occurs in the course of coiling, thus contributing to higher tightness of coiling the steel strip 13.

When being coiled the steel strip 13 (FIG. 1) is pressed against the shell 1 at the place of contact therewith across its full width by the rollers 20. The rollers are set at the angle of coiling of the steel strip 13 and ride along a helical line, thus being continuously shifted along the upper generatrix of the pressure vessel involved, the amount of their shifting per revolution of the pressure vessel shell 1 being equal to the coiling pitch. The force of pressing of the steel strip 13 is developed by the hydraulic thrust cylinders 24, and is so selected as to attain tight and snug pressing of the steel strip 13 against the pressure vessel shell 1 and to straighten small surface irregularities of the steel strip 13.

The fact that all the rollers 20 rest upon one common beam 23 via the forks 21 provides straightening of the steel strip 13 being coiled and its laying across the entire width in the form of a line parallel to the generating line of the cylindrical portion of the pressure vessel shell 1.

Once a layer of the pressure vessel shell has been laid the steel strip 13 is cut at the coiling angle and welded along the line of cut to the peripheral surface of the other end of the pressure vessel shell 1.

Then the whole process is repeated but a next layer is coiled in the direction opposite to the preceding one. This is attained due to the fact that the vessel shell 1 rotates in the same direction on, while the gantry 3 reverses its traverse.

The process of layer-by-layer coiling of the steel strip 13 occurs until the wall thickness of the vessel shell 1 becomes equal to a preset value.

Use of the device for helical coiling of pressure vessel shells makes it possible to manufacture pressure vessel shells featuring a greater number of steel strip layers coiled helically in the mutually opposite directions, thus providing for high coiling tightness of the steel strip, adequate operational reliability of pressure vessels produced and their safe operation.

Application of the device in question enables also the specific metal consumption of vessel shells to be reduced within certain limits. The pressure vessel shells made according to the techniques described above are devoid of heavy annular welds. High degree of labour mechanisation offered by the proposed device renders the process of production of pressure vessel shells less labour consuming.

Industrial Applicability

The present invention can be applied in mechanical engineering for the manufacture of multiwall pressure vessels, such as columns for syhthesis of ammonia, carbamide, methanol, reaction vessels for hydrocracking of petroleum products and those for mass exchange under high pressure of nuclear reactions.

We claim:

1. A device for helical coiling of pressure vessel shells, comprising:

a frame mounted for movement along the axis of a pressure vessel shell;

pressing means mounted on the frame to vertically traverse along a radius of the pressure vessel shell;

means for tensioning a steel strip as it is being uncoiled from a coil, said tensioning means spaced from the pressing means along the direction of run of the steel strip from the coil towards the pressure vessel shell;

said pressing means including a beam carried by the frame and provided with a plurality of forks rotatably carrying rollers, each of which rollers is mounted in its own fork and spaced from an adjacent roller a distance of 10 to 50 times the thickness of the steel strip and situated on the generatrix of the vessel shell across the width of the steel strip;

said steel strip tensioning means including a group of rolls of which a pair of rolls is arranged across the direction of run of the steel strip on opposite sides thereof and have a convex and a concave camber, respectively, facing the surface of the steel strip and of a radius of curvature determined by the thickness and mechanical properties of the steel strip and by the amount of plastic deformation required to compensate for the marginal effect tending to cause the edges of the steel strip to flange outwardly when the strip is being coiled onto the vessel shell past the pressing means.

* * * * *